(12) United States Patent
Bournival et al.

(10) Patent No.: US 9,652,333 B1
(45) Date of Patent: May 16, 2017

(54) MAINTAINING STORED DATA CONSISTENCY OF A PLURALITY OF RELATED VIRTUAL MACHINES ACROSS A PLURALITY OF SITES DURING MIGRATION

(71) Applicant: EMC IP Holding Company LLC, Hopkinton, MA (US)

(72) Inventors: Erin N. Bournival, Bedford, MA (US); David L. Black, Acton, MA (US); Saar Cohen, Moshav Mishmeret (IL); Assaf Natanzon, Tel Aviv (IL); Mark J. Halstead, Holliston, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 159 days.

(21) Appl. No.: 14/502,248

(22) Filed: Sep. 30, 2014

(51) Int. Cl.
*G06F 11/14* (2006.01)

(52) U.S. Cl.
CPC ...... *G06F 11/1464* (2013.01); *G06F 11/1435* (2013.01); *G06F 11/1453* (2013.01); *G06F 2201/84* (2013.01)

(58) Field of Classification Search
USPC .......................................................... 714/15
See application file for complete search history.

(56) References Cited

U.S. PATENT DOCUMENTS

| | | | | |
|---|---|---|---|---|
| 8,495,304 B1* | 7/2013 | Natanzon | ............ | G06F 11/1453 711/133 |
| 8,726,066 B1* | 5/2014 | Natanzon | ............ | G06F 11/2069 714/2 |
| 8,954,796 B1* | 2/2015 | Cohen | ...................... | G06F 11/00 707/674 |
| 9,032,160 B1* | 5/2015 | Natanzon | ................ | G06F 11/14 711/135 |
| 2009/0037680 A1* | 2/2009 | Colbert | .................. | G06F 3/0617 711/162 |
| 2012/0278283 A1* | 11/2012 | Hildebrand | ........... | G06F 11/203 707/634 |
| 2013/0054530 A1* | 2/2013 | Baker | ................ | G06F 17/30079 707/639 |

(Continued)

*Primary Examiner* — Kamini Patel
(74) *Attorney, Agent, or Firm* — Ryan, Mason & Lewis, LLP

(57) ABSTRACT

Stored data consistency is maintained at source and destination sites upon a failure when migrating a plurality of related virtual machines from the source site to the destination site. Consistency is maintained across a first site and a second site upon a failure during independent migrations of a plurality of virtual machines in a consistency group from the first site to the second site wherein at least a first virtual machine is executing at the first site and wherein at least a second virtual machine is executing at the second site, by performing a consistent snapshot at the first site of one or more storage volumes employed by the virtual machines in the consistency group; and performing a consistent snapshot at the second site of one or more storage volumes employed by the virtual machines in the consistency group. When data for the virtual machines in the consistency group is stored on at least two storage volumes at a single site, an improved site-distributed consistency feature performs a consistent snapshot of the storage volumes in the consistency group on a plurality of replication engines at both the first and second sites.

22 Claims, 5 Drawing Sheets

(56) References Cited

U.S. PATENT DOCUMENTS

| | | | | |
|---|---|---|---|---|
| 2014/0229694 A1* | 8/2014 | Clayton | .............. | H04L 67/1095 711/162 |
| 2015/0149999 A1* | 5/2015 | Ramanathan | ......... | G06F 9/4856 718/1 |
| 2015/0378766 A1* | 12/2015 | Beveridge | ........... | G06F 9/45558 718/1 |
| 2015/0378785 A1* | 12/2015 | Tarasuk-Levin | ...... | G06F 9/4881 718/1 |
| 2015/0378831 A1* | 12/2015 | Tarasuk-Levin | .... | G06F 11/1446 714/15 |
| 2015/0378847 A1* | 12/2015 | Tarasuk-Levin | .... | G06F 11/1471 714/19 |

* cited by examiner

MAINTAINING STORED DATA CONSISTENCY OF A PLURALITY OF RELATED VIRTUAL MACHINES ACROSS A PLURALITY OF SITES DURING MIGRATION

FIELD

The field relates generally to techniques for migrating virtual machines, and more particularly to techniques for maintaining stored data consistency when migrating virtual machines from a first site to a second site.

BACKGROUND

A planned migration of virtual machines can be performed to migrate one or more virtual machines from a protected source site to a destination recovery site, for example, to avoid a disaster that is predicted to occur in the vicinity of the source site. The goal of any planned migration is to relocate the virtual machines from the source site to the destination site while maintaining a consistent set of data, with a pair of consistent data images between the protected source site and the destination recovery site. Generally, during a planned migration, the virtual machine state and the associated storage at the destination site are synchronized with virtual machines at the source site. Once the virtual machine state and the associated storage of the virtual machine have been replicated at the destination site, the virtual machines at the source site can be suspended and started at the destination site. See, for example, the vMotion™ component of the VMware™ vSphere™ cloud computing virtualization operating system, commercially available from VMware, Inc., of Palo Alto, Calif. Generally, vMotion allows the live migration of one or more running virtual machines from one storage system to another storage system. Storage-based replication techniques employ the storage system to perform the replication of data.

Existing virtual machine migration products maintain consistency among stored data for a plurality of virtual machines at only one site and can migrate a plurality of virtual machines from a first site to a second site, as long as all of the virtual machines execute at only a single site at the same time. A consistency group is a set of storage volumes associated with virtual machines that is managed as a consistent entity. For example, the storage volumes for the various virtual machines of a particular application typically are managed as a consistency group. Stored data consistency is important so that if a failure occurs (e.g., a site disaster or network partition) at any point during a migration, the application can recover from a consistent (i.e., not corrupt) set of data for all of the virtual machines in the consistency group.

Due to the increasing size and complexity of the interrelated virtual machines in a typical consistency group, however, the individual virtual machines in the consistency group migrate at varying rates and may be in various states at the same time, such as active on the source site, active on the destination site or in transition from one site to another. For example, to conserve network resources, the virtual machine environment may be configured to support only one virtual machine in motion at a time. Therefore, when the virtual machines within a consistency group are active at more than one site at a given time, a need exists for maintaining stored data consistency at both the source site and the destination site upon a failure during the migration.

SUMMARY

Illustrative embodiments of the present invention include migration methods and apparatus that maintain stored data consistency at both the source and destination sites upon a failure when migrating a plurality of related virtual machines from the source site to the destination site.

In one exemplary embodiment, stored data consistency is maintained across a first site and a second site upon a failure during independent migrations of a plurality of virtual machines in a consistency group from the first site to the second site, wherein at least a first one of the virtual machines is executing at the first site and wherein at least a second one of the virtual machines is executing at the second site, by performing a consistent snapshot at the first site of one or more storage volumes employed by the plurality of virtual machines in the consistency group; and performing a consistent snapshot at the second site of one or more storage volumes employed by the plurality of virtual machines in the consistency group. The failure comprises, for example, a network partition or a site failure. In another exemplary embodiment, where data for a plurality of virtual machines in the consistency group is stored on at least two storage volumes located at a single site, an improved site-distributed consistency feature performs a consistent snapshot of the storage volumes in the consistency group on a plurality of replication engines at both the first and second sites.

DETAILED DESCRIPTION

According to one aspect of the invention, stored data consistency of a plurality of related virtual machines is maintained across a plurality of sites. In this manner, stored data consistency can be stretched across at least two different sites. The plurality of related virtual machines may be associated, for example, with an application.

In some virtual machine environments, a plurality of related virtual machines in a consistency group reside on multiple replication engines at a single site. A number of existing replication engines provide a site-distributed consistency feature that allows the multiple replication engines at a single site to be treated as a single unit for purposes of replication and consistency. As discussed further below, many existing site-distributed consistency implementations ensure that write operations occurring after a site or network failure are not considered part of the volume until after the remote and local write operations have completed successfully. Existing site-distributed consistency implementations ensure consistency when hosts write to multiple replication engines at a single source site. According to another aspect of the invention, the existing site-distributed consistency functionality is extended to maintain stored data consistency across all of the replication engines in the consistency group across multiple sites.

According to yet another aspect of the invention, the storage systems themselves are optionally used to replicate the data of the virtual machines. If the user is not already performing replication for disaster recovery at the time of the virtual machine migration, the storage arrays must set up replication between the source site and the destination site and allow the storage arrays to replicate the data before proceeding with the migration.

As used herein, a "site" indicates a customer-defined location where a plurality of related virtual machines execute. The location may comprise, for example, a building, a corporate campus, an office park or other locations in relatively close proximity.

While the present invention is illustrated herein primarily using VMAX™ storage arrays, commercially available from EMC Corporation of Hopkinton, Mass., the present invention may be employed with many typical storage technologies that support replication, including, for example, traditional storage volumes, RDMs (Raw Device Mapping storage in the VMware server virtualization environment), storage based on internal drives in servers and Virtual Volumes (VVols).

Figure 1:
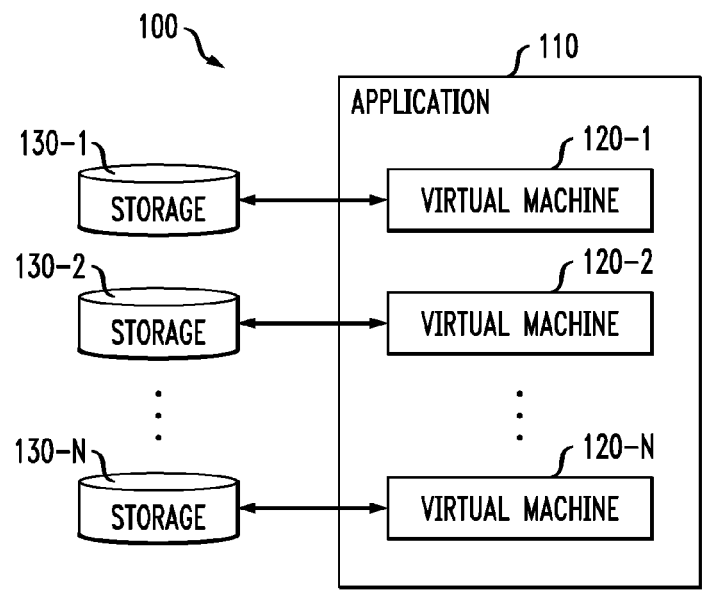
FIG. 1 illustrates an exemplary virtual machine environment in which the present invention may be employed.

FIG. 1 illustrates an exemplary virtual machine environment 100 in which the present invention may be employed. As shown in FIG. 1, the exemplary virtual machine environment 100 comprises an application 110 executing at a first site. The exemplary application 110 is comprised of a plurality of exemplary virtual machines (VMs) 120-1 through 120-N each with associated storage 130-1 through 130-N. It is noted that consistency requirements may span multiple applications, but the exemplary embodiments are described herein using a single application 110 as the consistency scope for ease of illustration. The storage 130 may be implemented, for example, using VMAX™ storage arrays, commercially available from EMC Corporation of Hopkinton, Mass.

In one exemplary implementation, a well-known Active/Passive replication relationship (supporting disaster recovery) is employed as the data transport. As used herein, active/passive replication means one-way replication from a source storage volume that is being actively updated to a destination source storage volume that is not updated except by the replication process.

In the exemplary virtual machine environment 100 of FIG. 1, a user, such as an administrator, wants to relocate (i.e., migrate) the virtual machines 120 of the exemplary application 110 from the local source site to a destination site (not shown in FIG. 1) of an Active/Passive replication relationship. Assume that the application 110 is important to the business of the user, and requires dependent-write consistency during the migration. Cross-virtual machine consistency is required to ensure the dependent-write consistency of data written to the source and destination replica pairs. For a more detailed discussion of dependent-write consistency, see, for example, U.S. Pat. No. 6,493,796, assigned to the assignee of the present invention and incorporated by reference herein.

The storage volumes of the exemplary virtual machine environment 100 of FIG. 1 may employ a variety of replication endpoints, including built-in replication features of physical arrays, software replication packages (usually running from within a virtual machine), or dedicated replication hardware. This configuration may exist physically (two arrays or replication engines in two different datacenters), may be Hybrid-Cloud based (a physical array or engine on one side, and replication software engines within an Infrastructure as a Service (IaaS) cloud on the other), or may be completely Cloud based (two software engines within two separate IaaS clouds).

Figure 2:
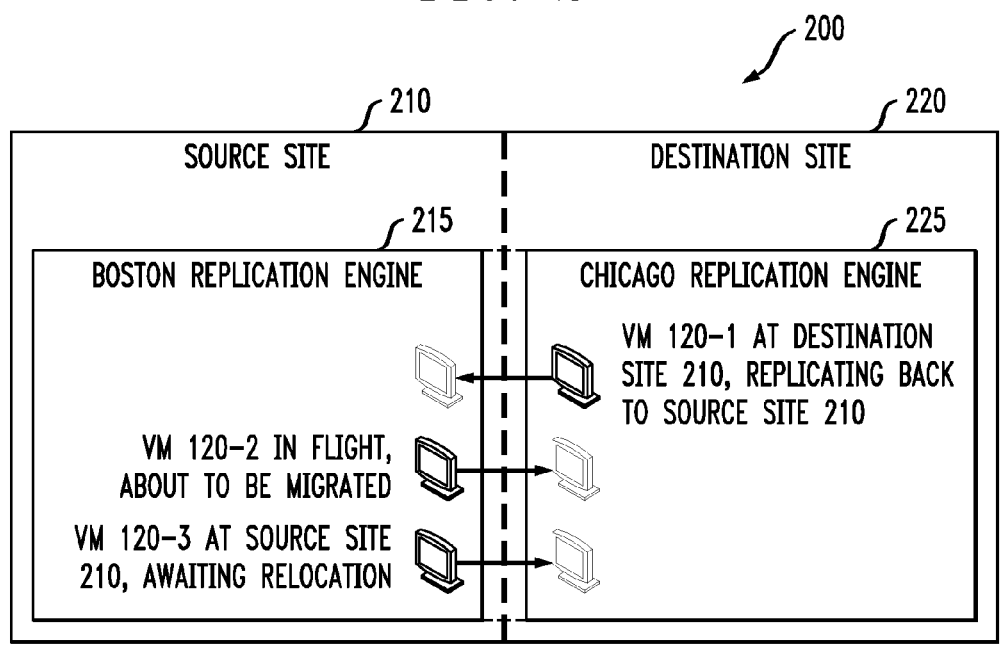
FIG. 2 illustrates an exemplary replication environment where three exemplary virtual machines are migrated from a source site to a destination site.

FIG. 2 illustrates an exemplary replication environment 200 where three exemplary virtual machines 120-1 through 120-3 of FIG. 1 are migrated from a source site 210 to a destination site 220. For example, the source site 210 may be in Boston, Mass. and comprise a replication engine 215. The destination site 220 may be in Chicago, Ill. and comprise a replication engine 225. The exemplary replication engines 215, 225 may be implemented, for example, using VMAX™ storage arrays, commercially available from EMC Corporation of Hopkinton, Mass.

In the notation employed in FIG. 2, a computer monitor icon indicates the storage 130 and the associated virtual machine 120 of FIG. 1, in an active state. In addition, a ghosted image of a computer monitor icon indicates that the storage 130 and the associated virtual machine 120 are not active (i.e., executing) at this location (i.e., the storage is the replication receiver being copied to).

During the migration of FIG. 2, the various virtual machines 120 are in the following states. Virtual machine 120-1 has successfully migrated from the source site 210 to the destination site 220, and is active on the destination site 220 and is replicating back to the source site 210. Virtual machine 120-2 is "in flight", still active on the source site 210, and about to begin migrating from the source site 210 to the destination site 220. Virtual machine 120-3 has not yet left the source site 210 and remains active on the source site 210.

As noted above, existing Active/Passive storage replication technologies do not offer the ability to maintain dependent-write consistency across multiple sites 210, 220. Rather, with existing Active/Passive storage replication technologies, volumes reside at the source site 210 and fail over as a single unit to the destination site 220. One aspect of the invention maintains consistency of a plurality of related virtual machines 120 across a plurality of sites 210, 220. In this manner, consistency can be stretched across at least two different sites 210, 220.

When a user (e.g., an administrator) initiates an "Online Virtual Machine Migration" of an application to the destination site 220, the virtual machines 120 of the application 110 begin migrating. The replication environment 200 switches the replication link to a synchronous mode to avoid losing host write operations during the migration. The user may be typically sharing the inter-site network resources with other departments in an enterprise organization, and has access to limited bandwidth for virtual machine migrations. The user has the option to move multiple virtual machines at once or restrict migration to a single virtual machine at a time.

Aspects of the present invention recognize that a migration process can encounter a site disaster or a network partition, and migration can be aborted by the source site 210 (if it is still running) in a number of scenarios. As discussed further below, a conventional consistency mechanism will simultaneously transition all volumes in the consistency group (i.e., within the set of inter-related virtual machines 120) to the failed state and replication ceases. At the surviving site, the virtual machines 120 continue execution and write to their volumes while the replicas at that same site become stale and out-of-date with regard to those active virtual machines 120, resulting in inconsistent images at the surviving site.

In one exemplary scenario, a site disaster can occur during a migration at the source site 210 and/or destination site 220. The virtual machines 120 at the surviving site will cease execution. As the failing replication engine is no longer reachable, the environment 200 cannot be programmatically restored to the pre-migration configuration (since some of the virtual machines 120 no longer exist). Replication stops immediately across all involved volumes. The application 110 may not function with missing virtual machines (VMs) and inter-VM IP communication fails. The application may stall.

In another exemplary scenario, the Storage Network may become partitioned. As the replication engines 215, 225 cannot communicate with each other due to the network failure, the environment cannot currently be restored to the pre-migration configuration. The virtual machines 120 can only be migrated once connectivity has been restored. Replication stops immediately across all involved virtual machines. The administrator would be responsible for selecting a site 210 or 220 for application recovery. Assuming that the inter-VM network has survived, inter-VM communication takes significantly longer, as some application virtual machines 120 are running at the destination site 220. If the inter-VM network was also severed, then the application 110 may begin failing, as one or more of its virtual machines 120 have become isolated. It may be desirable to involve a human administrator in the recovery decision, who would be responsible for avoiding automated decisions in the absence of complete site information.

In either scenario, the absence of a response to I/O issued from a host causes the replication relationship to transition from an active to a failure state. In an alternate implementation, the replication link may execute its own periodic test to determine that the link has failed (even in the absence of I/O). Unless a replication monitoring/polling system is present, failure will only be detected by explicit host I/O. Since replication engines must be tolerant of replication delays (and other storage-related delays), many seconds must elapse before the failure state can be confidently determined. When the host is idle and not performing frequent I/O, the delay may increase because there is no replication activity. The consistency mechanism will transition all replication relationships involved in replication to the failed state. This allows I/O to continue but terminates replication that would disturb the write-dependent consistent state of the replicas.

Figure 3:
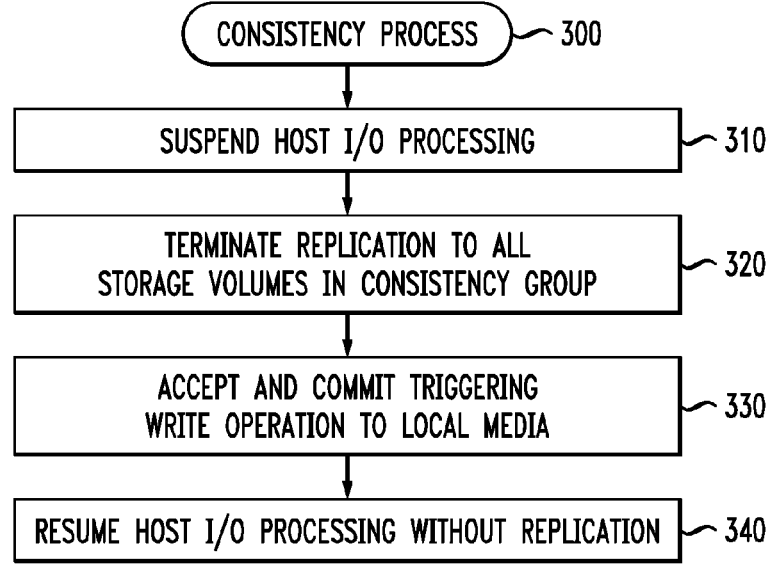
FIG. 3 is a flow chart illustrating an exemplary conventional consistency process that aims to preserve the consistent state of all replicas in the event of a failure at one site.

At the exact point of failure, replication is synchronous and storage replicas are dependent-write consistent. The next write from the application 110 times out and triggers the consistency logic of the replication engine 215, 225. FIG. 3 is a flow chart illustrating an exemplary conventional consistency process 300 that aims to preserve the consistent state of all replicas in the event of a failure, for example, at the destination site. As shown in FIG. 3, the exemplary conventional consistency process 300 initially suspends host I/O processing during step 310 and then terminates replication to all storage volumes in the consistency group during step 320 (thereby "Tripping" the group). The exemplary conventional consistency process 300 then accepts and commits the triggering write operation to local media during step 330, and host I/O processing resumes during step 340 without replication.

It is noted that replication ceases with the exemplary conventional consistency process 300 regardless of the cause of failure (i.e., a disaster at one site or a failure of the replication network). At the surviving site, however, virtual machines continue execution and write to their volumes, while the replicas at the surviving same site become stale and out-of-date with regard to those active virtual machines and hence there is no consistent image available to recover the entire application. In the event of a network partition case, this scenario happens at both sites 210, 220.

Consistency of Related Virtual Machines Across Multiple Sites

Figure 4:
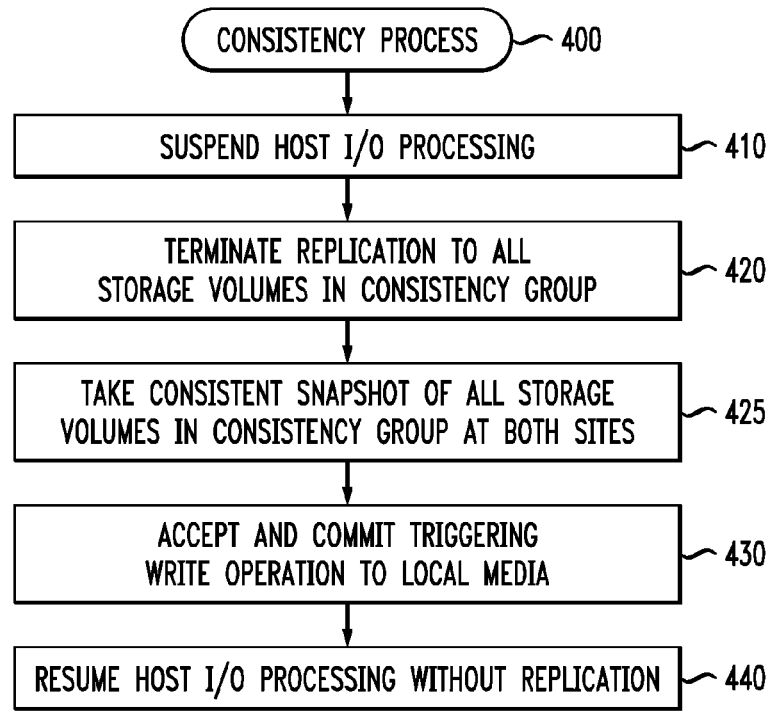
FIG. 4 is a flow chart illustrating an exemplary consistency process incorporating aspects of the present invention.

As noted above, one aspect of the invention maintains consistency of a plurality of related virtual machines 120 across a plurality of sites 210, 220. In this manner, consistency can be stretched across at least two different sites 210, 220. FIG. 4 is a flow chart illustrating an exemplary consistency process 400 incorporating aspects of the present invention. The consistency process 400 is performed at both sites 210, 220 as part of a migration to capture the virtual machine configuration and maintain consistency upon a failure of a replication link (or a site failure). Generally, the exemplary consistency process 400 is initiated when a replication failure in response to a write operation occurs during a migration of a plurality of related virtual machines. An optional safety snapshot of all storage volumes in the consistency group at the source site 210 can be taken before the migration begins.

As shown in FIG. 4, the exemplary consistency process 400 initially suspends host I/O processing during step 410 and then terminates replication to all storage volumes in the consistency group during step 420 (thereby "Tripping" the group). In accordance with the present invention, the exemplary consistency process 400 takes a consistent snapshot of all storage volumes in the consistency group during step 425 (e.g., all storage 130 for all virtual machines 120 of interest at both sites 210, 220). The exemplary consistency process 400 then accepts and commits the triggering write operation (e.g., the first write operation that failed because of a site disaster or network partition, and initiated the exemplary consistency process 400) to local media during step 430, and host I/O processing resumes during step 440 without replication, in a similar manner to the conventional consistency process 300 of FIG. 3.

The exemplary consistency process 400 maintains dependent-write consistency of the virtual machines 120, ensures image consistency and protects the customer from image corruption due to out-of-order write operations after a failure occurs. Among other benefits, the exemplary consistency process 400 permits the customer to recover from a failure by manually returning the application 110 to the last point in time when the application 110 as a whole was functioning correctly. Some storage arrays can be configured to immediately halt I/O processing when the failure occurs, and the virtual machines will be unable to continue. This will be critical in avoiding data loss, as the administrator would otherwise have to return to a snapshot taken by the consistency process 400 at the point of failure, losing write operations that occurred during the migration.

When synchronous replication is in use, replication engines 215, 225 normally apply a remote-first distribution model to ensure proper operation of consistency. That is, upon receiving a block of data from the host that is written to consistently replicated volumes, the data is normally sent to the remote site first. Once the remote site has written the data and acknowledged success, the local site may commit the data before returning status of the write call. This is important because if the ordering was reversed, the local site could become inconsistent before it determines that the remote site is unavailable.

For replication engines 215, 225 that deviate from this model, careful consideration should be taken to ensure that stretched consistency maintains proper consistency in all failure cases. This deviation is not an issue for single-site consistency, but it is a problem when replication can flow in two directions at once within the same Consistency Group.

Stretching Site-Distributed Consistency Across Multiple Sites

As noted above, in some virtual machine environments, a plurality of related virtual machines 120 in a consistency group reside on multiple replication engines at a single site 210 or 220 (for example, to achieve load balancing). A number of existing replication engines provide a site-distributed consistency feature that allows the multiple replication engines at a single site to be treated as a single unit for purposes of replication and consistency. For example, the Symmetrix Remote Data Facility (SRDF), commercially available from EMC Corporation of Hopkinton, Mass., provides a site-distributed consistency feature. See also, U.S. Pat. No. 6,493,796, assigned to the assignee of the present invention and incorporated by reference herein. Generally, the site-distributed consistency feature described in U.S. Pat. No. 6,493,796 disables mirroring communication from a second source storage device to a second target storage device in a data mirroring system when mirroring communication from a first source storage device to a first target storage device is disabled.

Existing site-distributed consistency implementations ensure that write operations occurring after a site or network failure are not considered part of the volume until after the remote and local write operations have completed successfully. Existing site-distributed consistency implementations ensure consistency when hosts write to multiple replication engines at a single source site. Another aspect of the invention extends the existing site-distributed consistency functionality to maintain consistency across all of the replication engines in the consistency group across multiple sites.

Figure 5:
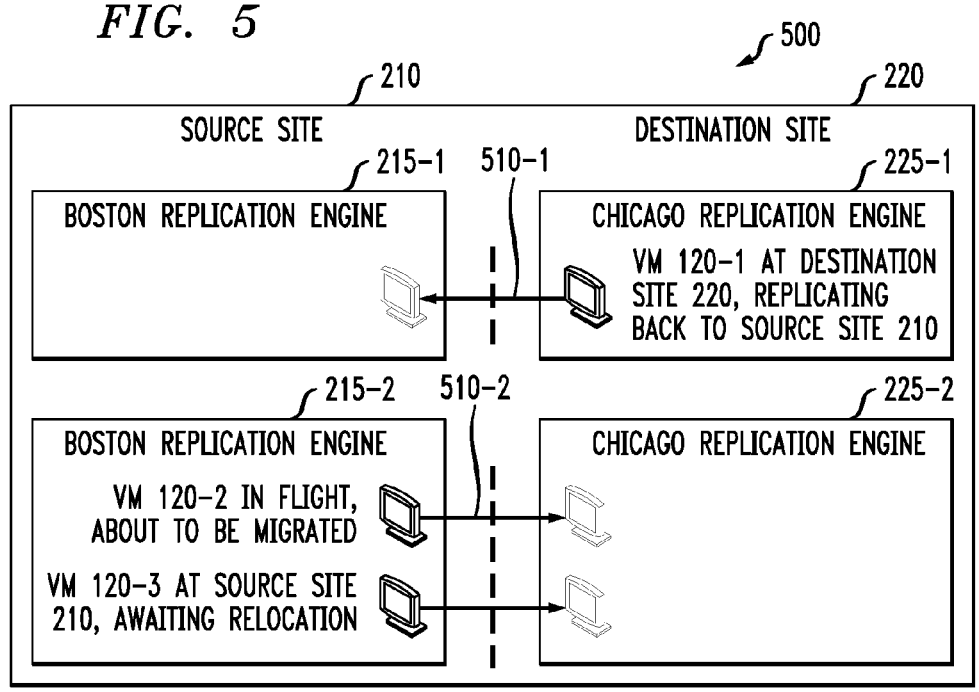
FIG. 5 illustrates an exemplary alternate replication environment in which the present invention may be employed.

FIG. 5 illustrates an exemplary alternate replication environment 500 in which the present invention may be employed. In the exemplary alternate virtual machine environment 500 of FIG. 5, the primary data storage 130 of the plurality of virtual machines 120-1 through 120-3 in the consistency group reside on at least two different replication engines 215-1, 215-2 at a single site, such as the source site 210. Thus, data for a plurality of related virtual machines 120 are spread across two storage arrays 215-1, 215-2 at the same site, such as the source site 210. As discussed further below, existing site-distributed consistency implementations ensure that if one link between a pair of replication engines 215, 225 at the two sites, such as the link between replication engines 215-1 and 225-1 fails, then the replication between the second pair of replication engines 215-2 and 225-2 is also suspended.

In the exemplary replication environment 500 of FIG. 5, three exemplary virtual machines 120-1 through 120-3 of FIG. 1 execute on two different replication engines 215-1, 215-2 at the source site 210. It is desired to migrate the three exemplary virtual machines 120-1 through 120-3 from the source site 210 to the destination site 220. For example, the source site 210 may be in Boston, Mass. and comprise two replication engines 215-1 and 215-2. The destination site 220 may be in Chicago, Ill. and comprise two replication engines 225-1 and 225-2. The exemplary replication engines 215, 225 may be implemented, for example, using VMAX™ storage arrays, commercially available from EMC Corporation of Hopkinton, Mass.

In the notation employed in FIG. 5, a computer monitor icon indicates the storage 130 and the associated virtual machine 120 of FIG. 1, in an active state. In addition, a ghosted image of a computer monitor icon indicates that the storage 130 and the associated virtual machine 120 are not active at this location (i.e., the storage is the replication receiver being copied to).

During the migration of FIG. 5, the various virtual machines 120 are in the following states. Virtual machine 120-1 has successfully migrated from replication engine 215-1 at the source site 210 to replication engine 225-1 at the destination site 220 using a first link 510-1, and is active on the destination site 220 and is replicating back to the source site 210. Virtual machine 120-2 is "in flight", still active on replication engine 215-2 at the source site 210, and about to begin migrating from the source site 210 to replication engine 225-2 at the destination site 220 using a second link 510-2. Virtual machine 120-3 has not yet left the source site 210 and remains active on replication engine 215-2 at the source site 210.

As noted above, an aspect of the present invention extends the site-distributed consistency functionality to maintain consistency across all of the replication engines 215-1, 215-2, 225-1 and 225-2 in the consistency group across at least two sites. Thus, in the example of FIG. 5, consistency must be maintained across all four replication engines 215-1, 215-2, 225-1 and 225-2, at two sites 210, 220. When one of the failures from the scenarios discussed above occurs (e.g., a site disaster or a storage partition), site-distributed consistency halts replication between all of the application's volumes on all replication engines 215-1, 215-2, 225-1 and 225-2, at both sites 210, 220.

Figure 6:
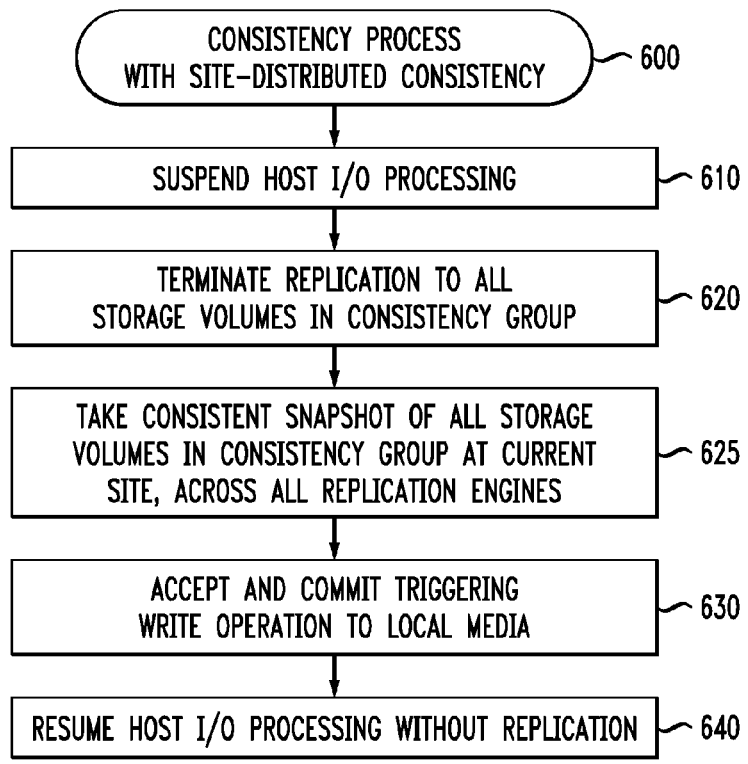
FIG. 6 is a flow chart illustrating an exemplary consistency process incorporating an improved site-distributed consistency aspect of the present invention.

FIG. 6 is a flow chart illustrating an exemplary consistency process 600 incorporating an improved site-distributed consistency aspect of the present invention. Generally, the consistency process 600 is performed separately at each site 210 and 220 as part of a migration to capture the virtual machine configuration and maintain consistency upon a failure of a replication link (or a site failure). Generally, the exemplary consistency process 600 is initiated when a replication failure in response to a write operation occurs during a migration of a plurality of related virtual machines. An optional safety snapshot of all storage volumes in the consistency group at the source site 210 can be taken before the consistency process 600 executes.

As shown in FIG. 6, the exemplary consistency process 600 initially suspends host I/O processing during step 610 and then terminates replication to all storage volumes at the single site currently under consideration in the consistency group during step 620 (thereby "Tripping" the group). In accordance with the present invention, the exemplary consistency process 600 takes a consistent snapshot of all storage volumes in the consistency group at both the source and destination sites 210, 220, across all replication engines 215-1, 215-2, 225-1 and 225-2 during step 625 (e.g., all storage 130 for all virtual machines 120 of interest at both sites 210, 220). The exemplary consistency process 600 then accepts and commits the triggering write operation (e.g., the first write operation that failed because of a site disaster or network partition, and initiated the exemplary consistency process 400) to local media during step 630, and host I/O processing resumes during step 640 without replication, in a similar manner to the consistency process 400 of FIG. 4.

As noted above, a site-distributed consistency implementation must ensure that write operations occurring after a site or network failure are not considered part of the volume until after the remote and local write operations have completed successfully. Existing site-distributed consistency implementations are prepared to do this when hosts write to replication engines at a single source site, but may require enhancements in accordance with the present invention to reliably perform the same function when consistency has been stretched across two sites.

Figure 7:
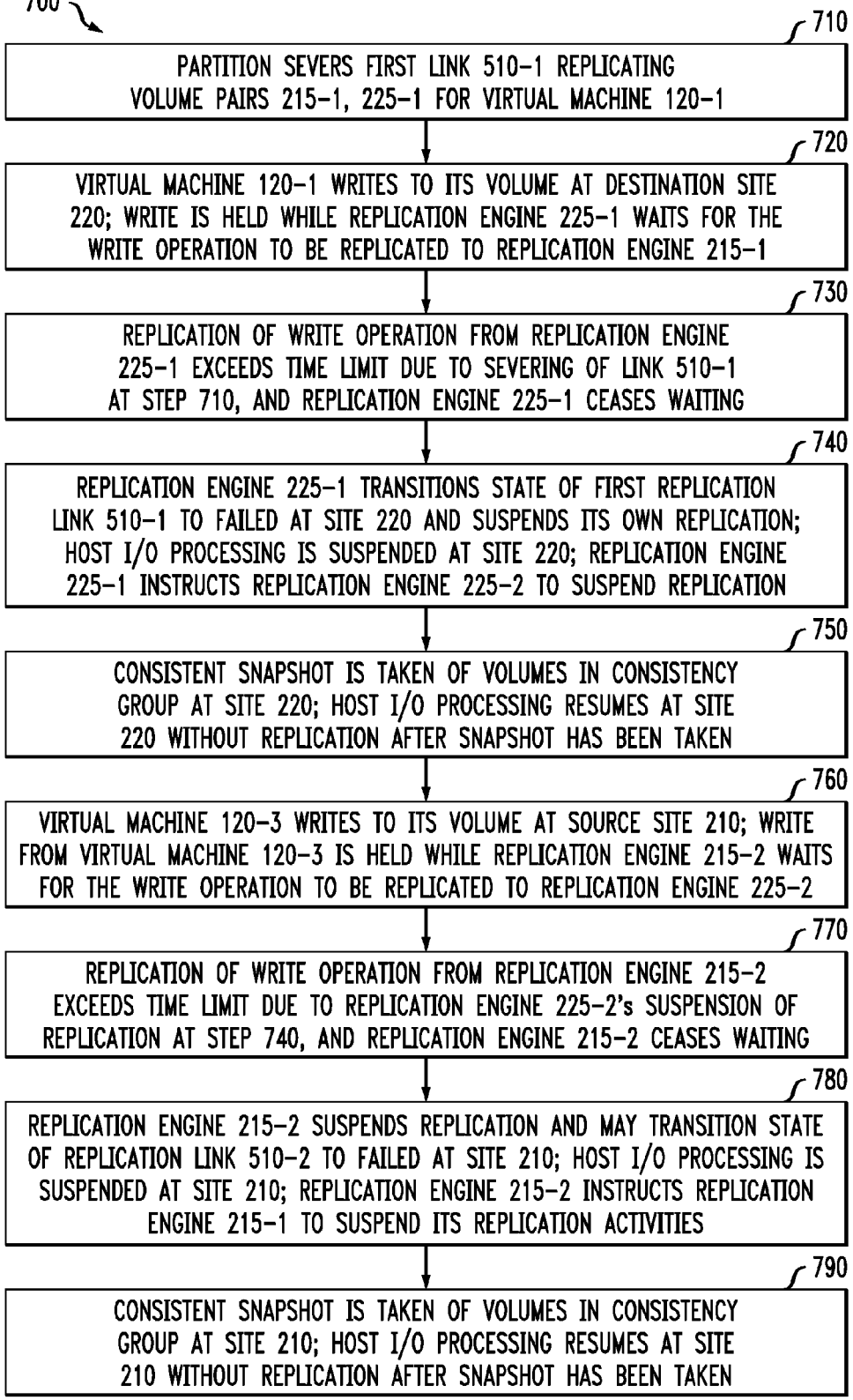
FIG. 7 is a flow chart illustrating an exemplary implementation of a consistency process with site-distributed consistency snapshots.

As noted above, site-distributed consistency is used to ensure the ordered dependent-write state of replicas that reside on the replica's replication engines. As discussed above in conjunction with FIG. 5, a migration has been initiated, and virtual machine 120-1 has been relocated to the destination site 220. FIG. 7 is a flow chart illustrating an exemplary implementation of a consistency process 700 with site-distributed consistency snapshots. As shown in FIG. 7, during step 710, a partition severs the first link 510-1 that replicates the exemplary Boston-to-Chicago volume pairs. Virtual machine 120-1 writes to its volume at the destination site 220 during step 720, and the write operation is held while the replication engine 225-1 at the destination site 220 waits for the write operation to be replicated to replication engine 215-1.

During step 730, the replication of the write operation from replication engine 225-1 exceeds its time limit and replication engine 225-1 ceases waiting. The state of the first link 510-1 maintained by the replication engine 225-1 at the destination site 220 transitions to a failed state during step 740; host I/O processing is suspended at site 220 and replication engine 225-1 instructs replication engine 225-2 to suspend replication. In step 750, a consistent snapshot is taken of the volumes being replicated by replication engines 225-1, 225-2, and host I/O processing resumes. It is noted that the state of the link 510-1 transitions independently from the point of view of each replication engine 215, 225. When replication engine 225-1 transitions the first link 510-1 to a failed state, replication engine 215-1 cannot detect the failure of the first link 510-1 and replication engine 225-1 cannot directly notify replication engine 215-1 of the failure state of the first link 510-1.

During step 760, virtual machine 120-3 writes to its volume at the source site 210, and the write operation is held while replication engine 215-2 at the source site 210 waits for the write operation to be replicated to replication engine 225-2. During step 770, the replication of the write operation from replication engine 215-2 exceeds its time limit and replication engine 215-2 ceases waiting (because replication engine 225-2 declined to perform the replication of this write operation). During step 780, replication engine 215-2 suspends its replication activities and may transition the state of the replication link 510-2 maintained by the replication engine 215-2 at source site 210 to a failed state. Host I/O processing is suspended at site 210, replication engine 215-2 instructs replication engine 215-1 to suspend replication. During step 790, a consistent snapshot is taken of the volumes being replicated by replication engines 215-1, 215-2 at the source site 210, and host I/O processing resumes.

During step 790, site-distributed consistency must ensure that the write operation from virtual machine 120-3 in step 760 is not part of the snapshot in order to ensure snapshot consistency. Some replication engines may require additional functionality to achieve this result. For example, replication engines 215, 225 that provide snapshots and that cache write operations internally with the volume may be designed to temporarily save write operations in volume cache upon initial receipt from the host, while those write operations are distributed to the remote site. Write operations can be easily destaged to local storage once remote status has been acknowledged. These cached write operations may be included when the snapshot is created, producing inconsistent snapshots. Consistency-management daemons at both sites 210, 220 can be clustered to ensure immediate failure detection, eliminating non-replicated write operations from the snapshots. However, clustering introduces a dependency on the storage network.

Other classes of replication engines 215, 225 provide snapshots and cache write operations internally separate from the volume, which is not included in snapshots until the remote and local write operations have completed. In the example of FIG. 5, these replication engines 215, 225 will create consistent snapshots at both the source and destination sites 210, 220, so that the write from virtual machine 120-3 does not propagate to its replica.

Yet another class of replication engines 215, 225 are based on logs containing an exemplary recovery point. This class of replication engines 215, 225 provide a bookmarking feature that identifies consistent images that can be constructed from the log. The consistency properties get realized as a consistent set of bookmarks across multiple logs associated with virtual machines or replicated volume pairs. Replication engines that provide a consistent bookmarking feature, such as log-based replication engines, permit the creation of bookmarks that only include replicated write operations, excluding non-replicated write operations. This ensures that the bookmarks are consistent with respect to all volumes in the consistency group.

For replication engines that do not offer consistent bookmarks, such as log-based replications that offer bookmarking but do not offer consistent bookmarks, another method of synchronization is required. Consistency-management daemons at both sites 210, 220 can be clustered to ensure immediate failure detection, eliminating non-replicated write operations from the bookmarks. However, clustering introduces a dependency on the storage network.

Among other benefits, the present invention combines virtual machine migration with storage replication, thereby allowing for efficient, robust virtual machine relocation. The addition of stretched consistency across multiple sites, optionally with site-distributed consistency, ensures the recoverability of multi-virtual machine applications while migrating during when a site disaster or network partition is encountered during the migration. The enhancements provided by the present invention permit the proper support of Stretched Consistency across multiple sites, and permit users to migrate their applications without fear of data loss that prevents recovery of the applications.

It should be appreciated that the particular features of the described two-site embodiments above are presented by way of example only, and other embodiments need not incorporate these features. The foregoing embodiments should be considered as illustrative only, and numerous other embodiments can be configured using the techniques disclosed herein, in a wide variety of different replication applications. For example, the migration techniques described in the context of two sites can be extended to more than two sites.

It should also be understood that the replication and migration functionality described herein can be implemented at least in part in the form of one or more software programs stored in memory and executed by a processor of a processing device, such as a computer. A memory or other storage device having such program code embodied therein is an example of what is more generally referred to herein as a "processor-readable storage medium."

The embodiments described herein provide a number of significant advantages relative to conventional practice. For example, these embodiments exhibit significantly enhanced consistency relative to conventional arrangements in which consistency is only possible for a single site.

A number of the devices described in conjunction with FIGS. 1, 2 and 5 may be implemented using one or more processing platforms. One or more of the processing modules or other components may therefore each run on a computer, storage device or other processing platform element. A given such element may be viewed as an example of what is more generally referred to herein as a "processing device."

Figure 8:
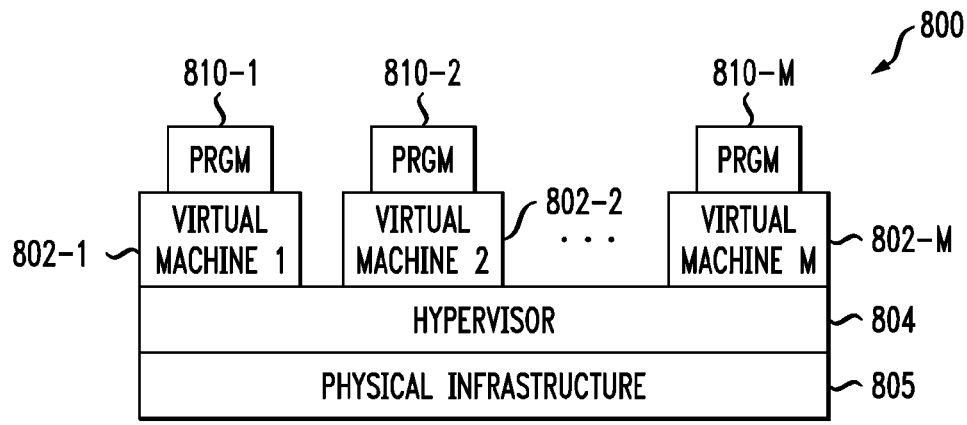
FIGS. 8 and 9 show examples of processing platforms that may be utilized to implement at least a portion of the migration systems described herein.

Referring now to FIG. 8, one possible processing platform that may be used to implement at least a portion of one or more embodiments of the invention comprises cloud infrastructure 800. The cloud infrastructure 800 in this exemplary processing platform comprises virtual machines (VMs) 802-1, 802-2, . . . 802-M implemented using a hypervisor 804. The hypervisor 804 runs on physical infrastructure 805. The cloud infrastructure 800 further comprises sets of programs 810-1, 810-2, . . . 810-M running on respective ones of the virtual machines 802-1, 802-2, . . . 802-M under the control of the hypervisor 804. It is noted that application 110 (FIG. 1), which may take the form of a "vApp," runs across a plurality of the virtual machines 802 of FIG. 8 and is comprised of a plurality of the programs 810. The cloud infrastructure 800 may encompass the entire system 100 or only portions of that system, such as one or more of the user devices, servers, controllers or protected resources in the system 100.

Although only a single hypervisor 804 is shown in the embodiment of FIG. 8, the system may of course include multiple physical machines, each with a hypervisor 804 providing a set of virtual machines 802.

An example of a commercially available hypervisor platform that may be used to implement hypervisor 804 and possibly other portions of the migration system described herein in one or more embodiments of the invention is the VMware® vSphere™ which may have an associated virtual infrastructure management system such as the VMware® vCenter™. The underlying physical machines may comprise one or more distributed processing platforms that include storage products, such as VNX and VMAX™, both commercially available from EMC Corporation of Hopkinton, Mass. A variety of other storage products may be utilized to implement at least a portion of migration system described herein.

Figure 9:
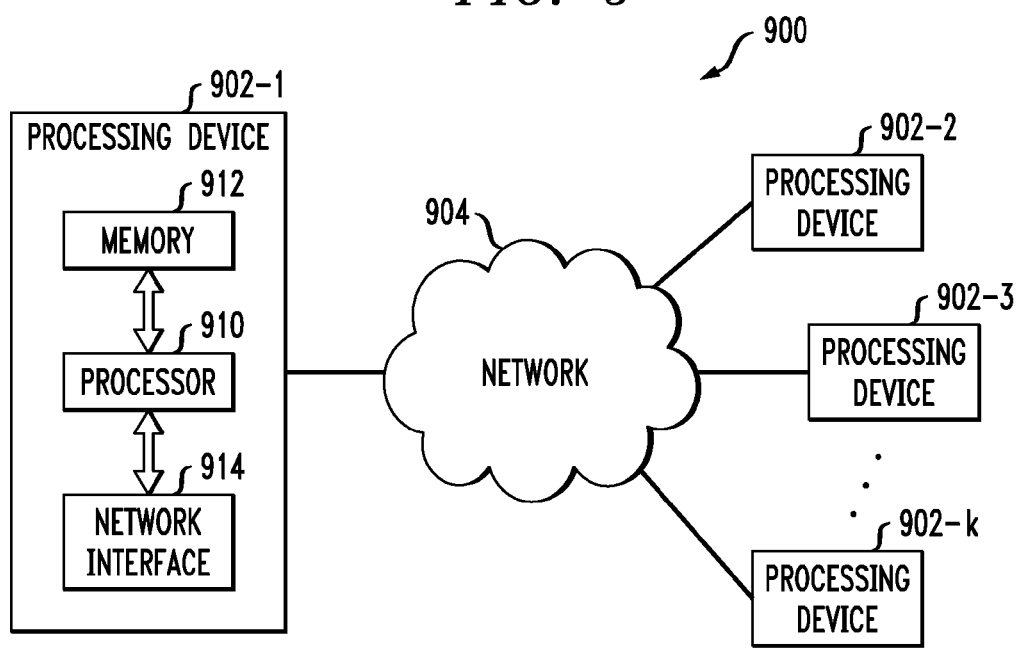

Another example of a processing platform is processing platform 900 shown in FIG. 9. The processing platform 900 in this embodiment comprises at least a portion of the system 100 and includes a plurality of processing devices, denoted 902-1, 902-2, 902-3, . . . 902-K, which communicate with one another over a network 904. The network 904 may comprise any type of network, such as a WAN, a LAN, a satellite network, a telephone or cable network, a cellular network, a wireless network such as WiFi or WiMAX, or various portions or combinations of these and other types of networks.

The processing device 902-1 in the processing platform 900 comprises a processor 910 coupled to a memory 912. The processor 910 may comprise a microprocessor, a microcontroller, an ASIC, an FPGA or other type of processing circuitry, as well as portions or combinations of such circuitry elements, and the memory 912, which may be viewed as an example of a "processor-readable storage medium" having executable computer program code or other software programs embodied therein, may comprise RAM, ROM or other types of memory, in any combination.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in FIG. 9 is presented by way of example only, and the migration system described herein may include additional or alternative processing platforms, as well as numerous distinct processing platforms in any combination, with each such platform comprising one or more computers, storage devices or other processing devices.

Multiple elements of the migration system described herein may be collectively implemented on a common processing platform of the type shown in FIG. 8 or 9, or each such element may be implemented on a separate processing platform.

In one or more embodiments, an article of manufacture is provided comprising a tangible processor-readable recordable storage medium having embodied therein one or more soft are programs, wherein the one or more software programs when executed by at least one processing device cause the data migration methods described herein to be performed.

It should again be emphasized that the above-described embodiments of the invention are presented for purposes of illustration only. Many variations and other alternative embodiments may be used. For example, the techniques are applicable to a wide variety of other types of devices and systems that can benefit from improved password security as disclosed herein. Also, the particular configuration of communication system, storage devices and processing device elements shown in FIGS. 1, 2 and 5, and the associated replication and migration techniques, can be varied in other embodiments. Moreover, the various simplifying assumptions made above in the course of describing the illustrative embodiments should also be viewed as exemplary rather than as requirements or limitations of the invention, and need not apply in other embodiments. Numerous other alternative embodiments within the scope of the appended claims will be readily apparent to those skilled in the art.

What is claimed is:

1. A data migration method for maintaining stored data consistency across a first site and a second site in an event of a failure during independent migrations of a plurality of virtual machines in a consistency group from said first site to said second site, said method comprising:
performing a consistent snapshot at the first site of one or more storage volumes employed by the plurality of virtual machines in the consistency group; and performing a consistent snapshot at the second site of one or more storage volumes employed by the plurality of virtual machines in the consistency group,
wherein at least a first one of said virtual machines is executing at said first site and wherein at least a second one of said virtual machines is executing at said second site at a substantially same time during said data migration.

2. The method of claim 1, wherein said failure comprises one or more of a network partition and a site failure.

3. The method of claim 1, further comprising the step of suspending input/output operations of one or more hosts.

4. The method of claim 1, further comprising the step of suspending replication of the storage volumes in the consistency group.

5. The method of claim 1, further comprising the step of resuming input/output operations of one or more hosts without replication.

6. The method of claim 1, wherein data for said plurality of virtual machines in the consistency group is stored on at least two storage volumes located at one or more of said first and second sites, and wherein said method further comprises the step of performing a consistent snapshot of the storage volumes in the consistency group on a plurality of replication engines at both the first and second sites.

7. The method of claim 6, wherein write operations occurring after a failure are not stored on one of said storage volumes until after remote and local write operations have completed successfully.

8. The method of claim 6, wherein one or more of said replication engines provide snapshots and cache write operations internally with at least one of said storage volumes, and wherein at least one consistency-management daemon executing at each of said first and second sites detects a failure and eliminates non-replicated write operations from the consistency snapshots.

9. The method of claim 6, wherein one or more of said replication engines provide snapshots and cache write operations internally separate from at least one of the storage volumes that are not included in the consistency snapshots until remote and local write operations have completed.

10. The method of claim 6, wherein one or more of said replication engines provide a consistent bookmarking feature that create bookmarks that do not include non-replicated write operations.

11. The method of claim 6, wherein one or more of said replication engines provide a consistent bookmarking feature and wherein at least one consistency-management daemon executing at each of said first and second sites detects a failure and eliminates non-replicated write operations from the consistency snapshots.

12. An article of manufacture comprising a tangible processor-readable recordable storage medium having embodied therein one or more software programs, wherein the one or more software programs when executed by said at least one processing device cause the method of claim 1 to be performed.

13. A data migration apparatus for maintaining stored data consistency across a first site and a second site in an event of a failure during independent migrations of a plurality of virtual machines in a consistency group from said first site to said second site, said apparatus comprising:
a memory; and
at least one processing device coupled to the memory configured to:
perform a consistent snapshot at the first site of one or more storage volumes employed by the plurality of virtual machines in the consistency group; and
perform a consistent snapshot at the second site of one or more storage volumes employed by the plurality of virtual machines in the consistency group, wherein at least a first one of said virtual machines is executing at said first site and wherein at least a second one of said virtual machines is executing at said second site at a substantially same time during said data migration.

14. The apparatus of claim 13, wherein said at least one hardware device is further configured to suspend input/output operations of one or more hosts.

15. The apparatus of claim 13, wherein said at least one hardware device is further configured to suspend replication of the storage volumes in the consistency group.

16. The apparatus of claim 13, wherein said at least one hardware device is further configured to resume input/output operations of one or more hosts without replication.

17. The apparatus of claim 13, wherein data for said plurality of virtual machines in the consistency group is stored on at least two storage volumes located at one or more of said first and second sites, and wherein said at least one hardware device is further configured to perform a consistent snapshot of the storage volumes in the consistency group on a plurality of replication engines at both the first and second sites.

18. The apparatus of claim 17, wherein write operations occurring after a failure are not stored on one of said storage volumes until after remote and local write operations have completed successfully.

19. The apparatus of claim 17, wherein one or more of said replication engines provide snapshots and cache write operations internally with at least one of said storage volumes, and wherein at least one consistency-management daemon executing at each of said first and second sites detects a failure and eliminates non-replicated write operations from the consistency snapshots.

20. The apparatus of claim 17, wherein one or more of said replication engines provide snapshots and cache write operations internally separate from at least one of the storage volumes that are not included in the consistency snapshots until remote and local write operations have completed.

21. The apparatus of claim 17, wherein one or more of said replication engines provide a consistent bookmarking feature that create bookmarks that do not include non-replicated write operations.

22. The apparatus of claim 17, wherein one or more of said replication engines provide a consistent bookmarking feature and wherein at least one consistency-management daemon executing at each of said first and second sites detects a failure and eliminates non-replicated write operations from the consistency snapshots.

* * * * *